United States Patent
Nevrekar et al.

(10) Patent No.: US 10,281,289 B2
(45) Date of Patent: May 7, 2019

(54) SEARCH ALONG THE ROUTE

(71) Applicant: Microsoft Technology Licensing, LLC, Redmond, WA (US)

(72) Inventors: Siddhika Nevrekar, Redmond, WA (US); Dzmitry Dulko, Redmond, WA (US); Nikola Todic, Belgrade (RS); Alexander Burmistrov, Moscow (RU); Aleksandar Samardzija, Belgrade (RS); Dvir Horovitz, Redmond, WA (US); Chelsea Mitchell, Bellevue, WA (US); Jason Chen, Bellevue, WA (US); Jyotkumar Patel, Bellevue, WA (US); Yekaterina Grabar, Seattle, WA (US)

(73) Assignee: Microsoft Technology Licnensing, LLC, Redmond, WA (US)

( * ) Notice: Subject to any disclaimer, the term of this patent is extended or adjusted under 35 U.S.C. 154(b) by 338 days.

(21) Appl. No.: 15/012,074

(22) Filed: Feb. 1, 2016

(65) Prior Publication Data

US 2016/0258767 A1    Sep. 8, 2016

Related U.S. Application Data

(60) Provisional application No. 62/129,902, filed on Mar. 8, 2015.

(51) Int. Cl.
*G01C 21/34* (2006.01)
*G08G 1/123* (2006.01)
(Continued)

(52) U.S. Cl.
CPC ....... *G01C 21/343* (2013.01); *G01C 21/3682* (2013.01); *G06F 17/3087* (2013.01)

(58) Field of Classification Search
CPC ............. G01C 21/343; G01C 21/3626; G01C 21/367; G01C 21/3682; G01C 21/00; G06F 17/3087
(Continued)

(56) References Cited

U.S. PATENT DOCUMENTS 5,615,116 A    3/1997    Gudat et al.
6,321,158 B1    11/2001    DeLorme et al.
(Continued)

FOREIGN PATENT DOCUMENTS

| CN | 102542339 A | 7/2012 |
|---|---|---|
| WO | 2010040400 A1 | 4/2010 |
| WO | 20130101045 A1 | 7/2013 |

OTHER PUBLICATIONS

Bereznak, Alyssa, "The 5 Awesome New Features of the Latest Google Maps Update", Published on: May 7, 2014, 9 pages, Available at: https://www.yahoo.com/tech/the-5-awesome-new-features-of-the-latest-google-maps-84933637494.html.
(Continued)

*Primary Examiner* — Mahmoud S Ismail

(57) ABSTRACT

Architecture that comprises features that enable smart searches along a route based on time to entities along the route and off the route, a user experience (UX) that showcases rich entities along the route, saving, sharing and editing capabilities across devices and users, smart ranking and filtering of entities, and user preferences and digital personal assistant interaction. After an itinerary is built, the itinerary can be saved for future use and/or shared with friends and/or other devices. Users can change the itinerary on-the-go by searching and adding entities, at a later time, for example. A digital personal audio assistant can be utilized to provide guidance based on the itinerary, and ask
(Continued)

users if they want to take a particular exit to visit some desired location (e.g., place of interest).

20 Claims, 7 Drawing Sheets

(51) Int. Cl.
  *G06F 17/30* (2006.01)
  *G01C 21/36* (2006.01)
  *G01C 21/00* (2006.01)
(58) Field of Classification Search
  USPC .................................................. 701/533, 200
  See application file for complete search history.

(56) References Cited

U.S. PATENT DOCUMENTS

| | | | |
|---|---|---|---|
| 7,496,444 B1 | 2/2009 | Fried | |
| 8,126,424 B2 | 2/2012 | Piett et al. | |
| 8,600,754 B2 | 12/2013 | Rychlik | |
| 2004/0172193 A1 | 9/2004 | Monde et al. | |
| 2006/0111834 A1 | 5/2006 | Bouget et al. | |
| 2007/0219706 A1* | 9/2007 | Sheynblat | G01C 21/3679 701/532 |
| 2008/0208445 A1 | 8/2008 | Bolton et al. | |
| 2010/0205060 A1 | 8/2010 | Athsani et al. | |
| 2010/0280748 A1 | 11/2010 | Mundinger et al. | |
| 2010/0332315 A1* | 12/2010 | Kamar | G06Q 30/02 705/14.46 |
| 2011/0106429 A1 | 5/2011 | Poppen et al. | |
| 2013/0138341 A1 | 5/2013 | Poppen et al. | |
| 2013/0325341 A1 | 12/2013 | Van Os et al. | |
| 2013/0325481 A1 | 12/2013 | van Os et al. | |
| 2014/0163867 A1 | 6/2014 | Fernandez | |
| 2014/0244110 A1 | 8/2014 | Tharaldson et al. | |

OTHER PUBLICATIONS

"Turn-by-Navigation (Beta)", Published on: Aug. 18, 2014, 4 pages, Available at: https://support.google.com/gmm/answer/3273406?hl=en.

Basu, "Plan an American Road Trip the Right Way with Roadtrippers", Retrieved From <<http://www.guidingtech.com/12507/plan-american-road-trip-rightway-roadtrippers/>>, Jul. 27, 2012, 5 Pages.

Horn, "You'll Want to Download Roadtrippers' Excellent New TripPlanning App", Retrieved From <<http://gizmodo.com/youll-want-to-download-roadtrippers-excellent-new-trip-1662832324>>, Nov. 24, 2014, 4 Pages.

Lardinois, "Roadtrippers Helps You Plan Your Summer Road Trip, Lands $250k Seed Round", Retrieved From <<https://techcrunch.com/2012/06/11/roadtrippers-helps-you-plan-your-summer-road-trip-lands-250k-seed-round/>>, Jun. 11, 2012, 5 Pages.

"International Preliminary Report on Patentability Issued in PCT Application No. PCT/US2016/021284", dated Jul. 6, 2017, 7 Pages.

"International Search Report and Written opinion Issued in PCT Application No. PCT/US2016/021284", dated Sep. 12, 2016, 21 Pages.

* cited by examiner

SEARCH ALONG THE ROUTE

CROSS-REFERENCE TO RELATED APPLICATIONS

This application claims the benefit of U.S. Provisional Patent Application Ser. No. 62/129,902 entitled "SEARCH ALONG THE ROUTE" and filed Mar. 8, 2015, the entirety of which is incorporated by reference herein.

BACKGROUND

A typical scenario in user map search can be to manually find a route from an origin and a destination, and then to look for activities and places to visit such as restaurants, coffee shops, gas stations, rest areas, scenic points, etc., along the route. A typical, but oftentimes, misplaced expectation is to find these activities and places suitably dispersed along the route and with some smart suggestions.

There is also a segment of users who when planning a road trip, for example, want to not only look for the activities and places along the route, but also to add these to their itinerary along the route. Additionally, users also may want to share this itinerary with other people such as friends and family, who can then use the itinerary untouched or edit the itinerary independently. Currently, there are specialized applications (e.g., "road trippers") that attempt to address these requirements; however, these applications are specific to the road trip scenario, lack complete routes or entities across the geographical area (e.g., the United States, Midwest, etc.), are geographically limited (e.g., US only), and/or primarily rely on curation for building a road trip.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture, generally, comprises features that include, but are not limited to, smart searches along a route based on time to entities along the route and off the route, a user experience (UX) that showcases rich entities along the route, saving aspects of the route, sharing and editing capabilities across devices and users, smart ranking and filtering of entities, and, user preferences and interaction with an intelligent interactive digital personal assistant (e.g., Cortana™, by Microsoft Corporation).

After the itinerary is built, the itinerary can be saved for future use and/or shared with friends and/or other devices. Users can change the itinerary on-the-go (while traveling along the route to execute the itinerary) by searching and adding entities, and at a later time, for example. Intelligent interactive personal digital assistants can be utilized to provide voice guidance based on the itinerary (e.g., new, old, or updated), and also ask users if they want to take a particular exit or alternative route to visit some desired location (e.g., an entity such as a place of interest).

The disclosed architecture can be implemented as a system, comprising: a route generation component configured to generate a route for presentation on a map, the route generated based on a user query for directions from a geographical origin to a geographical destination; an entity identification component configured to identify entities along the route based on intent of the user query and based on time to travel to the entities relative to the route; an entity card component configured to generate entity cards associated with the entities identified along the route, the entity cards include entity information associated with the entities and presented with the map; and, at least one hardware processor configured to execute computer-executable instructions in a memory, the instructions executed to enable the route generation component, the mapping component, and the entity card component.

The disclosed architecture can be implemented as a method, comprising acts of: receiving a user query for directions along a route defined from a geographical origin to a geographical destination; computing user intent based on the query and user information; identifying entities-of-interest along the route relevant to the user intent and based on time to reach the entities-of-interest; assigning to the route a greater number of the entities-of-interest at more popular locations as compared to less popular locations; and presenting the route and entities-of-interest.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
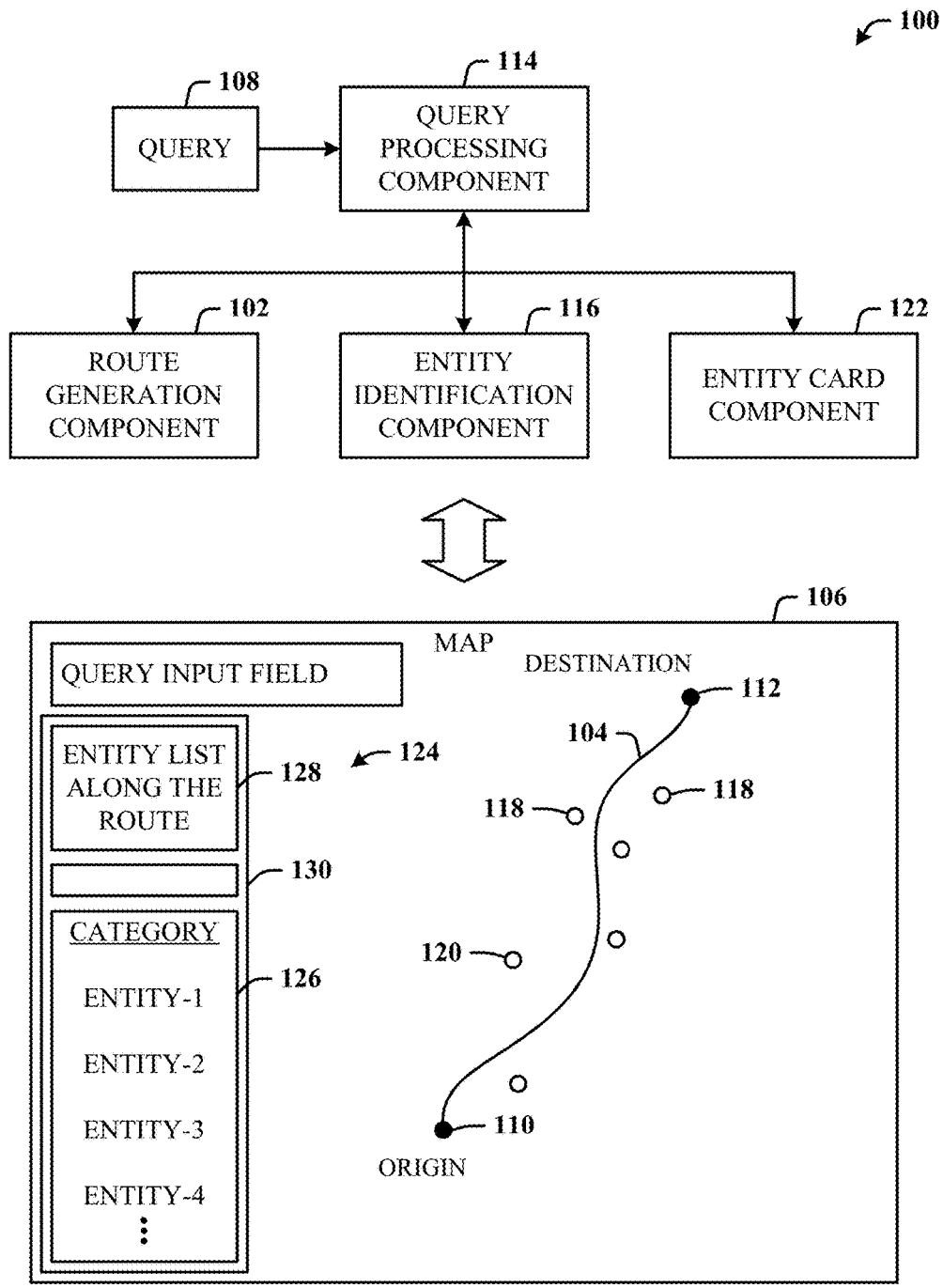
FIG. 1 illustrates a system in accordance with the disclosed architecture.

A typical scenario in map searches by a user is to manually build a route from a Point A and to Point B, and potentially from Point B to Point A along the same or different route, and then to look for entities such as restaurants, coffee shops, gas stations, rest areas, scenic points, etc., along the route and between these points. A desirable expectation is to find these entities suitably dispersed along the route (e.g., based on travel time, distance, type of entity (e.g., place to eat versus scenic overview), etc.) and with some smart suggestions (e.g., presented by the PDA and/or display system).

In addition to these types of users, there is also a segment of users who, when planning a road trip (or even a low-altitude flight route using a personal flying craft and devices such as a powered hang glider, drones, water craft on water routes, and the like), want to not only look for activities to do along the route, but also to add these activities to their itinerary, and perhaps share this itinerary and experience with other users such as friends and family who can then edit the itinerary independently and simultaneously for their own purposes.

The users may also want to save this completed road trip experience and tag (e.g., with metadata of time, date, location information, brief description of the scene, etc.) photos taken along the trip to serve as a memorable experience. Moreover, users may want a voice-enabled system (e.g., Cortana™ by Microsoft Corporation) to navigate and guide them throughout the trip. Cortana provides natural language processing and speech recognition for interactive voice communications and understanding of a user. Accordingly, Cortana can be speech activated, and learns about the user, user speech, the user actions, and activities.

The disclosed architecture, generally, comprises features that include, but are not limited to, smart searches along a route based on time to entities along the route and off the route, a user experience (UX) that showcases rich entities along the route, saving, sharing and editing capabilities across devices and users, smart ranking and filtering of entities, and user preferences and interaction using an intelligent interactive digital personal assistant. The disclosed architecture enables and/or is compatible with automated route detection. For example, given the geo-location identification technologies available, the tracking of user motion and travel can be detected. Thus, user travel on a route such as I-15 from Los Angeles, Calif. to Las Vegas, Nev., can be detected and inferences made that the user intends to travel from Los Angeles to Las Vegas. Responsive to such information, a user search made during this travel can then be automatically focused on entities along this identified route. The query need not be specific for this route, for example, "find restaurants on my travel on I-15 to Las Vegas, Nevada". Rather, the query can simply be, "find restaurants and gas stations", in response to which the disclosed architecture will return restaurants and gas stations along I-15 from Los Angeles to Las Vegas, Nev.

A desirable scenario in map search is for a user to build a single route or multiple routes between multiple points such as "to" (destination) and "from" (origination) points such as from point A to point B. Once this route is built, the user then desires to look for entities along the route such as restaurants, coffee shops, gas stations, motels, hotels, point of interest, rest areas, and so on. One expectation is to find these entities (e.g., places) conveniently dispersed along the route and associated with some smart suggestions (e.g., sales, service notifications, highlights, etc.).

By employing a search engine(s) that utilize obtained knowledge of local businesses and places across the globe, such search engine(s) can solve this problem for the users in a holistic way. With services such as map application Map App, Cortana, and Map Vertical, the experience for users will be seamless. Machine learning algorithms can be utilized to understand the user intent. Search engines such as Bing™ can also comprise technology to surface (expose) the right entities (smart entities for the users). For example, users typically do not want to see myriad locations of the same vendor (e.g., favorite coffee shops) along the route. Users may want to see more entities at popular locations instead of any location. For example, "if Lake Chelan is on the way, show more things to do there".

While textual notification of an entity is beneficial, integration with computerized digital personal assistants such as Cortana™ can be employed to describe an upcoming attraction (entity) using available rich data for local entities such as reviews, hours of operation, book a table, etc. This enables users to share and save road trips across several computing platforms such as a cell phone, desktop computer, tablet computer, and so on.

Generally, features of the disclosed architecture include, but are not limited to, smart searches along a route, a UX that showcases rich entities along the route, saving, sharing and editing capabilities across devices and users, smart ranking and filtering of entities, and user preferences and digital personal assistant interaction.

The backend part of the architecture employs a service which supports search along the route. Input parameters include, but are not limited to, user context, route description, category/chain business filters, and/or user query. Algorithms parse a query, derive (understand) user intent and meaning of every token of the query, filter out unimportant tokens (thereby retaining essential tokens), approximate the route, and prepare a request to the (business) index. The business index of a geographical area lists as many businesses as available (capable of doing business) possible in a given area. The search could also include public websites, etc., for parks, and so on, social networks, for traffic conditions, etc., in the geographical area (e.g., state, multi-state area, city, counties, and so on).

After ranked results are obtained from the index, the ranked results are post-processed (e.g., perhaps slightly reordered and filtered) and then returned to the caller. A frontend part or a client (e.g., map vertical, Cortana, map application) of the architecture provides an experience of free text search along the route and the building of the itinerary by adding discovered entities (e.g., businesses, sightseeing, attractions, etc.) to the route.

After the itinerary is built, the itinerary can be saved for future use and/or shared with friends and/or other devices. Users can change the itinerary on-the-go by searching and adding entities, at a later time, for example. Cortana can be utilized to provide guidance based on the itinerary, and ask users if they want to take a particular exit to visit some desired location (e.g., place of interest).

Selecting an entity on the map shows information or more information on the card. In reverse, selecting a card identifies the corresponding entity point on the route. The architecture shows the entities within a radius of the route, but based on time to reach the entity. Entities are identified which are conveniently reachable within a certain amount of time along the route. Although a business may be close to the route in distance, if the actual route to get to the business takes excessive time because the route winds around and requires more complicated navigation to reach the entity, this entity may not be shown. Accordingly, the option of the close entity is identified and presented.

The architecture can be made user customizable, where, for example, the user selects entities within a timed distance (e.g., five minutes) versus auto selection of a default time criterion. For example, if the user is on vacation, the user is more likely to have time to drive farther off the route. Whereas, if the user is traveling for work, the user will more likely than not, want to reach the destination more quickly rather than take detours off the route, and also, will want to know where the more essential services are, such as for food, gas, etc., rather than entities such as scenic overviews. Alternatively, based on user preferences or user travel history, only entities related to the user interests for this given time are identified and presented.

User intent can be the basic intent derived from the query, but can go much deeper based on past user search history, user preferences, user location, time of day, etc.

Other users to whom the itinerary is shared can also be enabled to edit the shared itinerary. Photographs, videos, audio files and other types of media associated with a given entity can be tagged and saved for each of the entities. Thereafter, when retrieving the stored itinerary, these tagged media types can also be retrieved such that the itinerary is presented with the richness of media associated with it. The photos can be tagged with location information (e.g., using GPS) to associate with the entity on the route. The photos can be stored in a separate photo location, yet be retrieved when replaying or editing the itinerary at a later time, as long at the photo source is linked to the itinerary file and file location. The user can choose whether to keep the camera photo and/or the stock photos of the entity that are presented in association with the entity along the route. This applies to other content generated at that time such as audio files, video files, etc. Moreover, the content can be saved in chronological order.

It can be the case that when sharing an already-traveled itinerary, other users can be given access to that itinerary or parts there of (in consideration of privacy issues) so the other users can actually see how the route might be, by viewing photos, other authorized/permitted media content, etc.

Additionally, multiple different itineraries from different users can be associated with a route, and merged in part or merged entirely. Thus, users can choose parts from multiple different itineraries for their own purposes. Such itineraries can be made available publicly to users who are beginning navigation along the same route but under the same or different conditions (e.g., vacation, work, etc.). Additionally, these other itineraries can be linked-to itineraries on the map and identified as itineraries of other people, generally, or specific to a given other user.

The returned results can be filtered. The filtering enables the user to filter results based on details of each result. For example, for hotels, "show me all hotels that have swimming pools, or saunas, or child play areas".

The disclosed architecture can also apply to travel of different types, such as air travel at stops, businesses in an airport, ocean cruises at ports, hiking trails, train travel, and so on. For example, an itinerary for air travel can include stops at different airports, showing the desired restaurants, gate locations, places to eat close to the gate location or on the way to the gate location, and so on. For ocean cruises, the architecture can be used for itinerary generation onboard the cruise ship, at ports, or both, for example.

It can also be the case to show a larger number of entities along the route or in an area along the route that is computed to be more popular than other entities. Popularity can be determined from past user behaviors of travels on the route, trending information from social networks, other user itineraries, and so on. Output can be via the UX map interface and/or Cortana, for example.

It is within contemplation of the disclosed architecture that user interactions can occur in ways broadly referred to as gesture-enabled, whereby the user employs one or more gestures for interaction. For example, the gestures can be natural user interface (NUI) gestures. NUI may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems, all of which provide a more natural user interface, as well as technologies for sensing brain activity using electric field sensing electrodes (e.g., electro-encephalograph (EEG)) and other neuro-biofeedback methods.

The disclosed architecture exhibits technical effects rooted in computer technology to overcome problems specifically occurring in the realm of computer systems and networks. More specifically, the architecture enables improved user efficiency and increased user interaction performance in the use of mapping programs for navigating geographical locations, points of interest, using voice communications interaction with the mapping application rather than solely a hands-on (tactile contact) requirement, and at least for organizing images captured along the navigation route. Additionally, the itinerary and some or all related content can be shared with other users and/or content consumers.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 that facilitates search along a route in accordance with the disclosed architecture. The system 100 can include a route generation component 102 (or manager) configured to generate a route 104 for presentation on a map user interface 106. The route generation component 104 can comprise frontend and backend systems and services that enable the generation and presentation of maps in a map user interface 106. The route generation component 104 can also facilitate user interaction with objects of the map user interface 106. The map user interface 106 is provided with objects relevant to the itinerary, including an interactive map that shows the route 104 in a geographical area, an entity search interface (e.g., via the query input field) of the geographical area, entity information, and itinerary editing as the itinerary is being executed, for example. The route 104 is generated based on a user query 108 for directions from a geographical origin 110 to a geographical destination 112.

The query 108 can be processed by a query processing component 114 such as comprises a search engine (e.g., web-based, enterprise-based, client-based, local entity searches, etc.) that also processes map queries, and/or a dedicated mapping engine that processes map queries for local search (e.g., local businesses). The query processing component 114 can also be configured to process the query, compute directions intent from the query, perform business chain classification, and perform business-to-taxonomy classification. The directions intent can include the intent to define directions that take a main highway as the route to the destination, or a less traveled country road to the destination, which would normally provide more things to see during travel to the destination. The directions intent also comprises the combination of both such that the directions intent can be to take the main highway until a specific entity(or point)-of-interest is reached, after which the route can be to navigate to the less traveled and more scenic country route to the destination (and possibly, back to the main highway route to the destination).

The business chain classification determines if a particular business identified as an entity along the route or departures from the route, is part of a company chain where many instances of the business are sited in different locations of the geographical area. In this way, if the user has a history of frequenting the business, it may computed the user would probabilistically want to visit this particular business more than once while traveling along the route.

The business-to-taxonomy classification determines the relationship of business to the various types of entity categories can be identified. The business-to-taxonomy classification identifies classes and/or categories of businesses, such as pizza places, gas stations, outlet malls, etc., and creates a hierarchy of such identified business entities. In an alternative implementation, the business-to-taxonomy classification can further be employed to classify non-business entities such as scenic overviews, places in which vehicles can pull to the side of the road, rest stops, medical facilities, emergency services, government agencies and buildings, and so on. This capability facilitates an enhanced UX for travelers who may be medically restricted to receiving care are predetermined times, needs hands-on medical attention, and so on.

An entity identification component 116 (or manager) can be provided and configured to identify entities 118 (two of the six entities 118 denoted as empty circles) along the route 104 based on intent of the user query 108, and based on time to travel to the entities 118 relative to (to and from) the route 104. For example, the time criterion for all routes or a given route can be to identify all entities that take no more than five minutes to travel from the route 104 to the entity (e.g., an entity 120). This means that the entities 118 need not be equidistant from the route, but only based on the time criterion to get to the entity. Alternatively, the time criterion can be the total time (roundtrip time) to get to the entity 120 from the route 104 and return from the entity 120 to the route 104.

In a robust implementation, the time criterion can be determined based on the mode of transportation of the user(s). For example, if the user is cycling, the time from the route 104 to the entity 120 can be greater than if driving a car. Accordingly, the entities 118 identified along the route 104 may be closer to the route 104 (more time taken to travel to the entity) than if driving a car (comparatively, less time to reach the entity 118).

In yet another implementation, the time criterion can be adjusted automatically based on the average speed or driving habits/behavior of the driver, or the geography of the area. For example, if the user tends to drive fast, the time to detour from the route to the entity 118 would likely take less time, for the entity 120 being farther from the route 104. Additionally, if the route winds through a mountainous area for a few miles, the entity 120 may be closer to the route due to the increased time needed to drive to the entity 120 in the mountainous area versus driving to the entity 120 if the entity 120 was on a plain.

This means that when using time as the primary criterion, other parameters can be adjusted to meet the time criterion for different geographical topographies, purposes of the trip (whether static or changing), road conditions, traffic conditions, weather conditions, emergency conditions, and so on.

The entity generation component 116 is configured to employ ranking and filtering of entities based on changing dynamics of user requirements as the itinerary is navigated. That is, if user reaction/interaction to any aspect of the current itinerary is interpreted to be a change in what the user wants to see or do (a user requirement), filtering and ranking can be executed based on this new change (or requirement). It can be the case that ultimately, nothing changes in the itinerary; however, it may be more likely that some aspects of the itinerary will need to be adjusted based on this new requirement (e.g., unplanned weather conditions, road conditions, new interesting entities-of-interest, etc.).

The system 100 can also comprise an entity card component 122 (or manager) configured to generate one or more entity cards 124 associated with the entities 118 (and entity 120) identified along the route 104. The entity cards 124 include entity information associated with the entities (118 and 120) and presented with the map user interface 106.

For example, for a search for "gas stations" initiated by a query in the query input field, a category entity card 126 is generated and presented that lists some or all gas stations along the route 104. Filtering is applied to eliminate gas station entities not meeting certain filter criteria (e.g., distance from the route, brand, prices, services, hours of operation, etc.). Additionally, the category entity card 126 further comprises details about each gas station, such as hours of operation, address, phone number, exit on the route, vendor name, gas prices, and so on. The category entity card 126 can list the gas stations based on certain criteria, such as the order in which the user will arrive at a given station along the route based on the user travel heading, based on gas prices of the entity stations, based on facilities/services provided in addition to fueling such as restaurants, and so on.

The category entity card 126 can be presented with a specific graphical emphasis such as color, which makes it easy for the viewer to see. Thus, all entities of the category entity card 126 are presented on the map in the same color and at the corresponding geographical locations along the route. Thus, the user can choose which entities to add to the itinerary, and which entities to not add to the itinerary.

An (expanded) entity list card 128 lists the origin, destination, and one or more popular entities (entities-of-interest) along the route 104. The entity list card 128 and category entity card 126 can be presented in a scrollable panel (or card) 130 such that the user can scroll to and expand sections for more detailed information about the entities related to a specific entity type. Here the scrollable panel 130 shows a collapsed representation in a color different from the color of the expanded category entity card 126.

It can be the case that the map user interface 106 is automatically updated as the user reaches points along the route 104. Thus, the cards and information of the cards may be presented as slowly changing as the user moves along the route. It can also be the case that as the user approaches an entity-of-interest along the route, the map user interface 106 automatically accesses and presents information about the approaching entity-of-interest and/or information about the entity-of-interest the user passed. This system behavior can serve to perhaps pique the user interest on the return travel along the route 104. Thus, cards can be automatically presented and removed from view based on travel of the user along the route 104. This enhances the UX by presenting a live rolling experience as the user travels along the route 104 (in either direction). The disclosed architecture can be employed with a personal digital assistant that enables at least one of interactive voice or gesture communications for a description of an upcoming entity.

Figure 2:
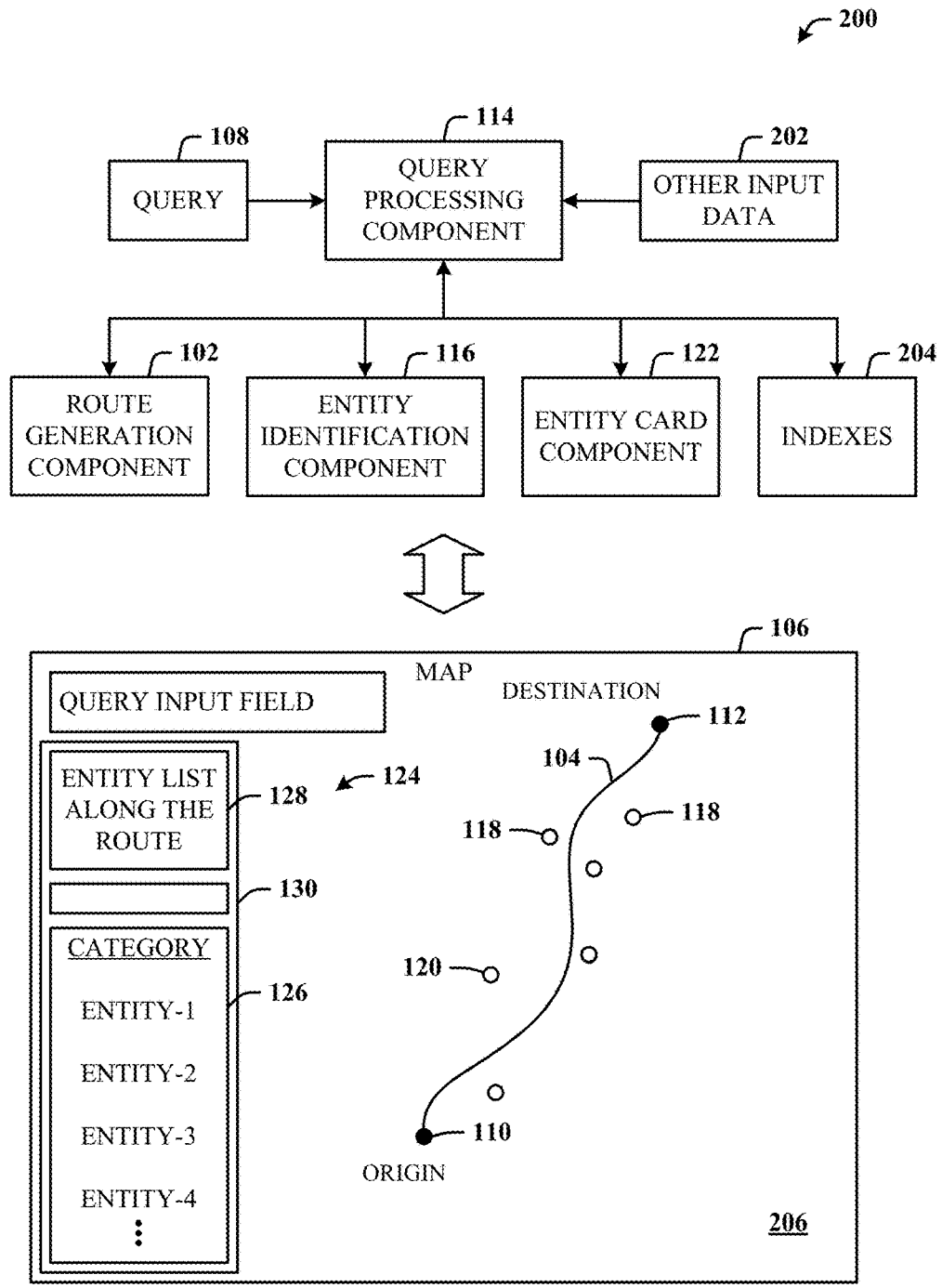
FIG. 2 illustrates an alternative system in accordance with the disclosed architecture.

FIG. 2 illustrates an alternative system 200 that facilitates search along a route in accordance with the disclosed architecture. The system 200 comprises the blocks depicted in system 100 of FIG. 1, as well as other blocks. For example, system 200 further indicates other input data 202 that can be utilized as input to the query processing component 114, such as input data (parameters) that include user context, route description, user query, business category filter, and business chain filter.

User context can comprise several different aspects. For example, user context can comprise user location context the physical geographical location of the user at a specific point in time, as can be identified using geo-location coordinate systems such as GPS (global positioning system). User location can also be identified from check-in systems that identify that a user has purchased an item or product at a certain location and time. User location can also be derived from social networks where the user may insert content (e.g., text, pictures, etc.) that can be processed to identify the location of the user.

User context can also comprise user application context which is knowledge obtained by the disclosed architecture about the activities or interactions of the user in the map user interface 106 and/or device applications, in general, using technology that identifies user interactions (e.g., text input, object clicks, voice recognition, speech commands, air gestures, etc.). For example, when the user selects a point-of-interest along the route 104, user application context is identified as interacting with the specific point-of-interest on the map tile(s). When the user is interacting with the search box (the query input field), the user application context comprises activities related to search, such as initiating a new search, reviewing a previous search, processing the same search again, etc. When interacting with one of the cards, the user application context comprises such card interaction and specific pieces of content selected. User application context can also include a sequence of interactions such as moving from the route to a specific piece of content in the cards or listing, which sequence of interactions can be useful in defining various types of intent, such as directions intent.

The system 200 can further comprise one or more indices 204 against which searches can be processed. For example, the indices 204 can include a geospatial index configured to index entities and relationships of the entities. The relationships can include distance information such as distances between the entities (e.g., from a first entity to a distant entity, from a second entity to the adjacent entities on either side of the second entity along the route, from a given entity along the route to any entity within a specific radius from the given entity, etc.).

The relationships can include the geographical order of the entities along the route of a geographical area. For example, it can be determined that from the origin that the user will arrive at entity-1 first, along the route, followed by entity-2, then entity-3, in a sequential order, and so on. The geographical order can also include concurrent branches to multiple entities. For example, it can be the case that multiple entities may reside near the third entity along the route, such that the geographical order can be similar to the following: origin→entity-1→entity-2→(entity-3/entity-4/entity-5)→entity-6, and so on. This indicates that there are three entities associated with the third entity; the third entity (entity-3), a fourth entity (entity-4) and a fifth entity (entity-5). Thereafter, after departing from the geographical area of the third entity, the geographic ordering continues to a sixth entity (entity-6), and so on along the route. As previously indicated, distance information can be derived for each of these relationships. Distance information can be by "miles", geographical coordinates (e.g., latitude/longitude), physical addresses, and/or other suitable means.

The indices 204 can also include a feeds index. The feeds are frequently updated data sources (e.g., web feeds) analyzed for data extraction as to social trends in information, such as news, hiking, trails, etc., essentially, any data that can be processed and considered relevant to an entity along the route 104. For example, there can be a hiking feed that provides updated information from users who currently are hiking or have hiked a point-of-interest considered along the route 104, and based on user preferences the user may want to see as part of the itinerary. Such hiking feed information may also be surfaced based on a search by the user in the map user interface 106 when preparing the itinerary prior to travel along the route, while executing (traveling) the itinerary, and/or when editing the itinerary into a new itinerary (e.g., "tuning" the existing itinerary for re-execution of the updated itinerary in the future) after having completed the itinerary.

Another type of feed is a news feed. It can be the case that the user enjoys visiting entities that may be "in the news". Thus, the itinerary can include a newsworthy point-of-interest along the route, as determined form the feeds index. Many other types of feeds can be accessed and employed to enhance the UX in the disclosed architecture, such as traffic feeds for given cities along the route, construction feeds, weather feeds, and so on.

The map user interface 106, enabled by the systems 100 and 200, e.g., as a service), is enabled with objects relevant to the itinerary, including an interactive map 206 (also in system 100) that shows the route 104 in a geographical area, an entity search interface (e.g., the query input field) of the geographical area, entity information (on the map 206 and cards 126, 128, and 130), and itinerary (the route and entities along the route) editing as the itinerary is being executed.

Figure 3:
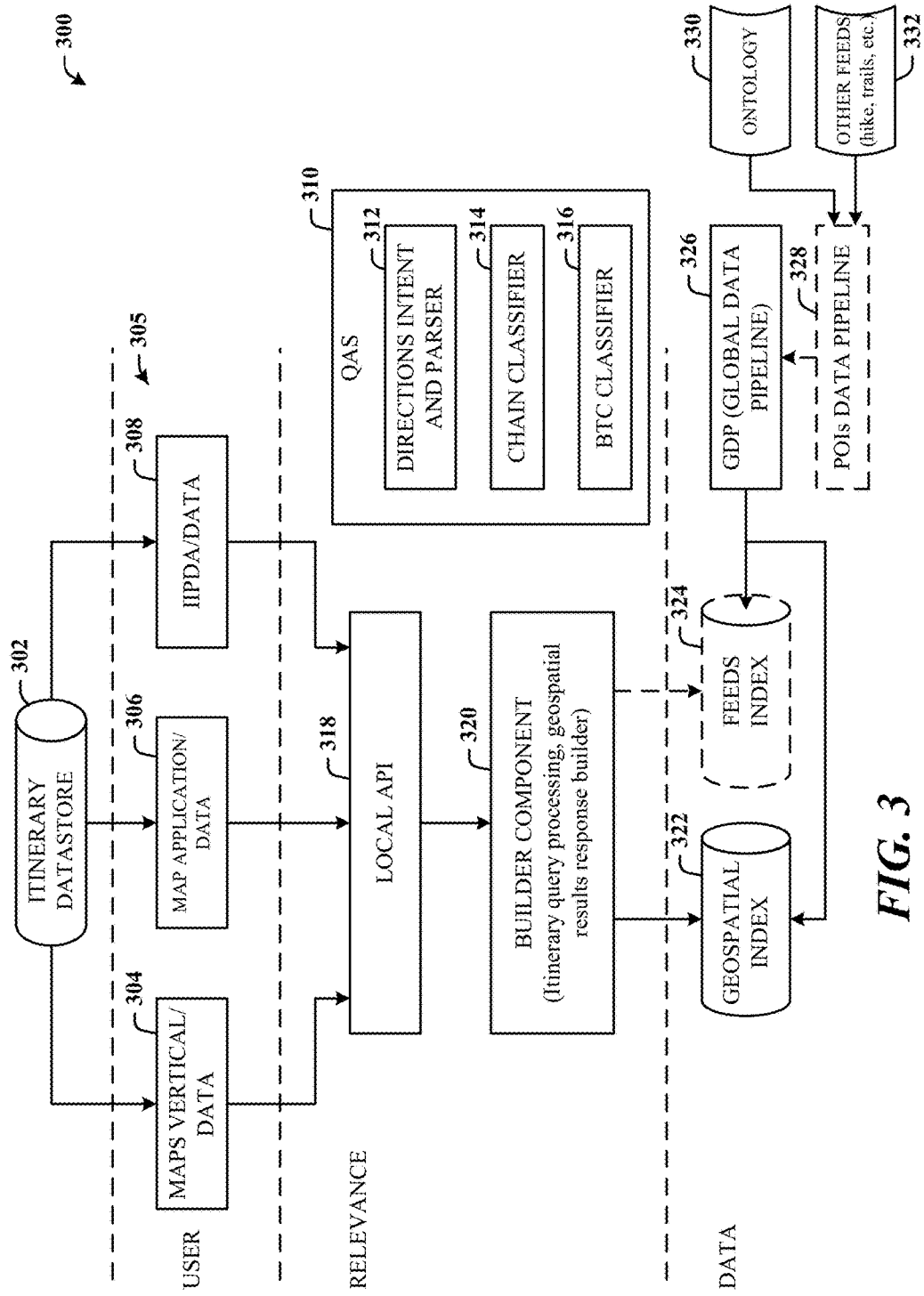
FIG. 3 illustrates an alternative system that provides searching along a route in accordance with the disclosed architecture.

FIG. 3 illustrates an alternative system 300 that provides searching along a route in accordance with the disclosed architecture. The implementation of the system 300 can be described according to sections of systems: a user section of user systems, a relevance section of relevance computation systems, and a data section of data computation systems.

An itinerary datastore 302 stores data for user interface types 305 (e.g., three) in the user section, of a maps vertical/data 304, map application/data 306, and the intelligent interactive digital personal assistant (IIPDA)/data 308 (e.g., Cortana™). The itinerary datastore 302 can be remote from the user section. The maps vertical/data 304, map application/data 306, and the IIPDA/data 308 can be clientside interfaces each associated with interface data. The data for these interface types 305 can be retrieved separately and synchronously/asynchronously from the itinerary datastore 302, and in various combinations (e.g., route and images; route and entities; map, route, route information, entities, entity information, photos, and entity cards, etc.) to rebuild the itinerary experience (e.g., the entire set of map(s), user interface, card presentation, user interaction manually/voice recognition, etc., in full or in part, for playback, editing, sharing, etc. (e.g., after the trip has been completed, while the trip is being conducted, etc.). In other words, sharing can also be made in part or in full during or after the road trip has been completed.

In the relevance section, a query annotation service (QAS) 310 is provided that overall, determines what the user is asking (the intent in searching). The QAS 310 can be implemented as part of the query processing component 114 of systems 100 and 200, for example. In the mapping environment, for example, if the user enters a query for Spokane or New York City, this is computed that the user intent is asking for directions for these cities; thus, the user is shown driving directions and/or visual routes in and around these locations.

In support of deriving user intent from the query, the QAS 310 comprises a DIP (directions intent and parser) component 312, a chain (business name) classifier 314, and a BTC (business-to-taxonomy) classifier 316. The DIP component 312 analyzes the query for user intent. The chain classifier 314 analyzes the query and attempts to identify the query as a "chain" query of a business chain of stores. Once identified, an identifier for the business is returned and can be used to populate the route. The BTC classifier 316 identifies classes and/or categories of businesses, such as pizza places, gas stations, etc. Once the query is received, the query is analyzed to assign the query to a category/class identifier. The category/class identifier then enables entity searches only for entities that relate to that type of identifier. Thus, the QAS 310 functions to understand (by analysis) the user query and output information as to the user intent.

A local API 318 is an abstraction layer that ensures clientside data and signals of the user section are formatted to a standardized format for system processing for the relevance section. For example, the client device (e.g., running any one or more of the maps can be a mobile phone, tablet, portable computer, etc., each of which can generate and handle data differently. The path data, category identifier, and so on, are passed from the local API 318 to a builder component 320.

The builder component 320 performs local search processing (e.g., businesses) for itinerary query processing and geospatial response building, which segments the route with points to be able to search by travel time along those points of the route. The category identifier (e.g., gas stations) is used at this time to know the type of entities use to populate the route. The builder component 320 can be implemented as part of the query processing component 114 of systems 100 and 200, for example.

The output of the builder component 320 is passed to one or more indices in the data section, such as a geospatial index 322 and a feeds index 324 (e.g., both as part of the indices 204 of system 200). In the geospatial index 322, all businesses are organized by distance to each other. For example, this hotel is next to this gas station, and this is the distance between the two. Thus, once the query is processed, the geospatial index 322 is accessed. The feeds index 324 is an optional index that indexes feeds information from the builder component 320 and a GDP (global data pipeline) 326.

The GDP 326 accesses and manages data from partner vendors. For example, data received from a trip advisor and other related partner sources are processed by the GDP 326 to remove duplicates. A POI (point-of-interest, also referred to as an entity-of-interest) data pipeline 328 stores location information, other than businesses, which typically are attractions, overviews, landmarks, etc., which vacationers typically will want to visit along the route.

A map ontology 330 is provided having map hierarchies of places, such as for a country. For example, a hierarchical ontology for the United States can include the country at the top level, followed by the next level of state, followed by a third level of counties, and a fourth level of cities, and so on. Other feeds 332 can be inputs related to hiking data, social media data (e.g., Facebook™, Twitter™, etc.), weather data, road conditions data, special events data, and traffic conditions data for rush hour, accidents, and so on.

The other feeds 332 and ontology 330 can be processed through the POI data pipeline 328 and GDP 326 for additional information to be indexed in the feeds index 324 and geospatial index 322.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service.

The disclosed architecture can optionally include a privacy component that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 4:
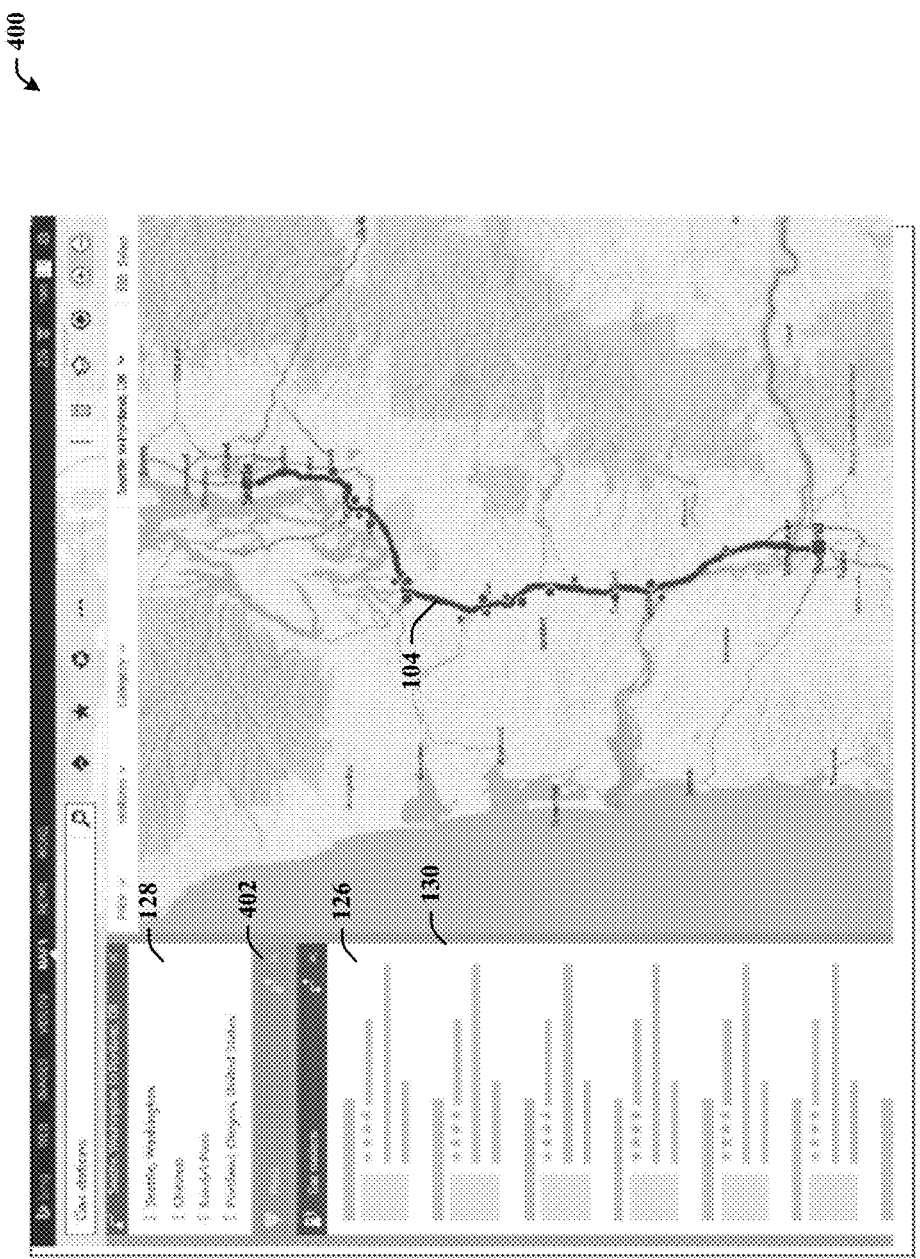
FIG. 4 illustrates a user experience map interface in accordance with the disclosed architecture.

FIG. 4 illustrates a user experience map interface 400 in accordance with the disclosed architecture. The map interface 400 is similar to the map user interface 106, at least with respect to the panel (or card) 130, the entity list card 128, and category entity card 126. Note that entities of a particular category can be visually related to the category entity card 126 using any type graphical emphasis such as color, bolding, font size, etc. For example, all gas stations listed in the category entity card 126 (a color blue) for gas stations can match the color (e.g., blue) of the corresponding gas station entities along the route 104. Similarly, pizza entities for a pizza category entity card 402 (e.g., colored pink) can match the color (e.g., pink) of the corresponding pizza place entities along the route 104.

Additionally, selection of a specific entity along the route automatically visually identifies the corresponding entity information in the panel 130. Conversely, selection of a specific entity information in the panel 130 automatically visually identifies the corresponding entity along the route 104. Other interactive capabilities can be provided such as auto-zoom of the map for a selected entity, and information dialog boxes that auto-appear in response to a hover action by a pointing device, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
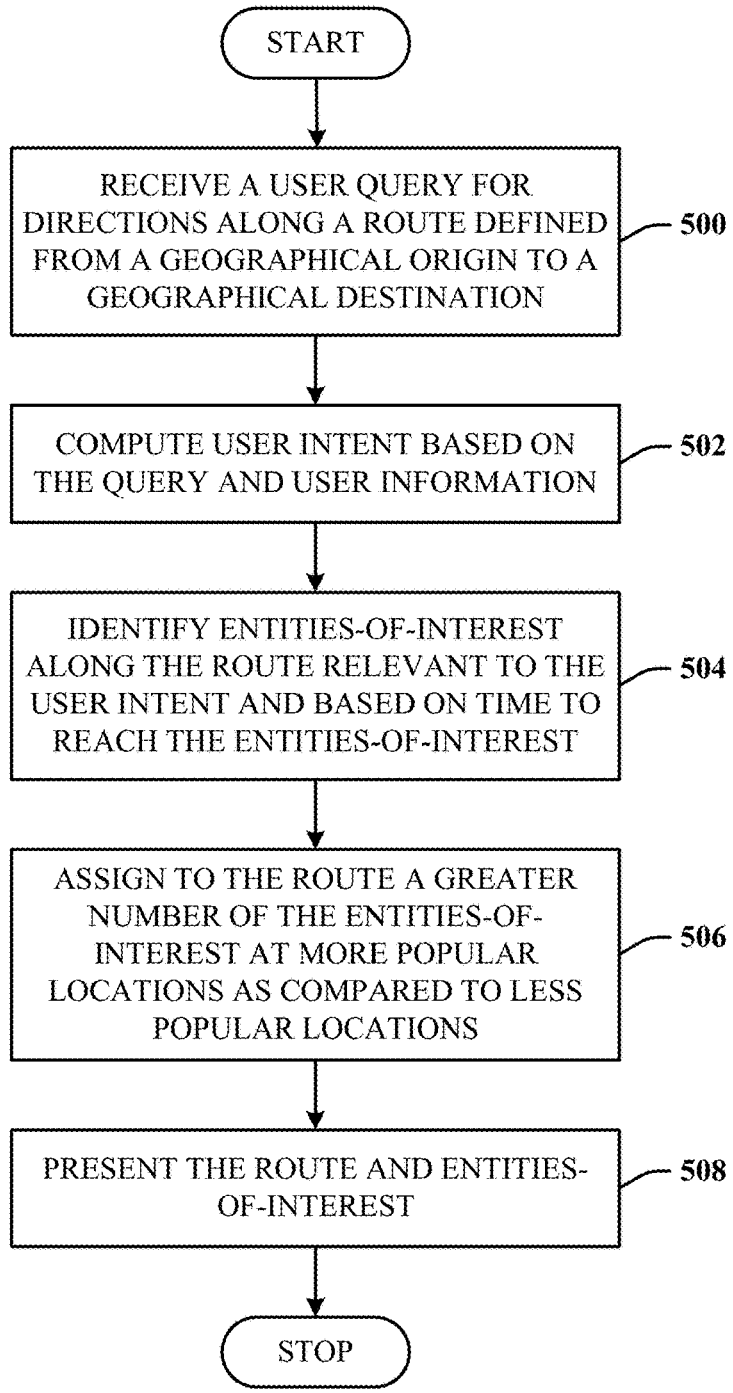
FIG. 5 illustrates a method in accordance with the disclosed architecture.

FIG. 5 illustrates a method in accordance with the disclosed architecture. At 500, a user query for directions along a route is received as defined from a geographical origin to a geographical destination. For example, the query can simply be "generate a map from Point A to Point B". At 502, user intent is computed based on the query and user information. User intent can be computed using many different ways. For example, user intent can be determined by parsing and analyzing each of the substantive query tokens. This can further include searching, while also considering user geographical location, accessing user schedules that may indicate the schedule time for a certain event such as vacation, a meeting, a business trip, etc.

At 504, entities-of-interest along the route are identified, as relevant to the user intent and based on time to reach the entities-of-interest (from the route). The user intent can also be ascertained by the user indicating a timeframe in which the trip must be completed. Alternatively, this timeframe limitation can be identified by user actions that manually eliminate (e.g., select and delete) entities from the route 104.

At 506, a greater number of the entities-of-interest at more popular locations are assigned to the route 104 as compare to less popular locations. Popular entities can be identified from feed and geospatial indices, for example. Thus, once designated as a popular entity along the route 104, the service can operate to identify and populate the map 206 with other entities proximate the popular entity, such as services normally useful for the popular entity. For example, if the popular entity is a sporting event, the other entities can include bars, restaurants, hotels, etc., considered to be normally used with such popular entity.

At 508, the route and entities-of-interest are presented (e.g., on a map and in combination with the map). Presentation can be by way of a browser or other application interface, such as a mapping application. It can be the case that the itinerary can be input to a typical navigation device (e.g., OnStar™) and executed therefrom using the full software and hardware visual and audio capabilities of the device.

The method can further comprise sharing the itinerary with other users and across devices of the user. As previously indicated, in one implementation, the itinerary can be input to another proprietary device, provided file and application execution are compatible. In other sharing ways, the itinerary file can be communicated across devices of a single user, to devices of other users, who can then edit or use the itinerary as they choose.

The method can further comprise enabling tagging and storage of content obtained along the route. The disclosed architecture enables the user to drill down into content surfaced. Thus, content can be accessed and stored as the user desires. Similarly, the user can take pictures, for example, and upload the pictures and other content (e.g., audio files, video files, etc.), for association with a specific entity. For example, if a point-of-interest is a hiking trail, the user can upload content captured related to the hike, into the itinerary file, and as tagged for the given hiking trail entity, for playback and presentation at a later time. Thus, during playback of the itinerary, once execution progresses to the hiking trail entity, the associated content will be played or offered for presentation to the user.

The method can further comprise editing the itinerary to expand as travel occurs along the route. In other words, the itinerary is an evolving set of data that can be changed in realtime as the user is traversing the route. Entities can be added or deleted based on direct user editing before, during, or after the trip is completed. This editing also includes changing the content associated with any given entity of the itinerary.

It can also be the case that a given entity, once examined by the user during travel, actually can have additional sub-entities that were not identified in the indices, but that the user can now create for this itinerary. For example, the hiking entity indexed may simply include the trail and some scenic views. However, once traveled by the user, the user can establish new sub-entities of the hiking trails, such as waterfalls, ponds, lakes, glens, etc. Once created and added to the user itinerary, these new "entities" can then be fed back into the disclosed architecture as entities for other users to employ.

The method can also further comprise performing a new search during travel along the route, and updating the itinerary to a new itinerary that includes new entities based on travel time of the entity for the route. In this case, the itinerary is limited by the amount of time the user wants to expend in making the trip. For example, if the trip would normally take two hours, but the user will now allocate four hours, the itinerary can be expanded to include other entities the user might be interest in visiting. Similarly, in reverse, if the trip would normally take two hours, but the user wants to make the trip in two hours, and is a business trip, the itinerary may not be populated with non-business related entities, but simply a rest stop, a gas station, and a coffee shop—the minimum services that the user might want to see along the route.

The method can further comprise performing interactive voice communications with the device, which is an interactive personal digital assistant, to interact with the itinerary. The disclosed architecture is compatible for use in Cortana-type devices, for example, or any other voice interactive devices/systems, such as vehicle computing systems, tablets, cell phones, portable computers, etc.

The method can further comprise performing ranking and filtering of the entities-of-interest. The ranking can be adjusted based on user preferences or other input data that change during navigation of the itinerary, for example. Additionally, filtering and ranking can change automatically/dynamically based on changing user preferences, user intent, searches, user context, and so on.

Figure 6:
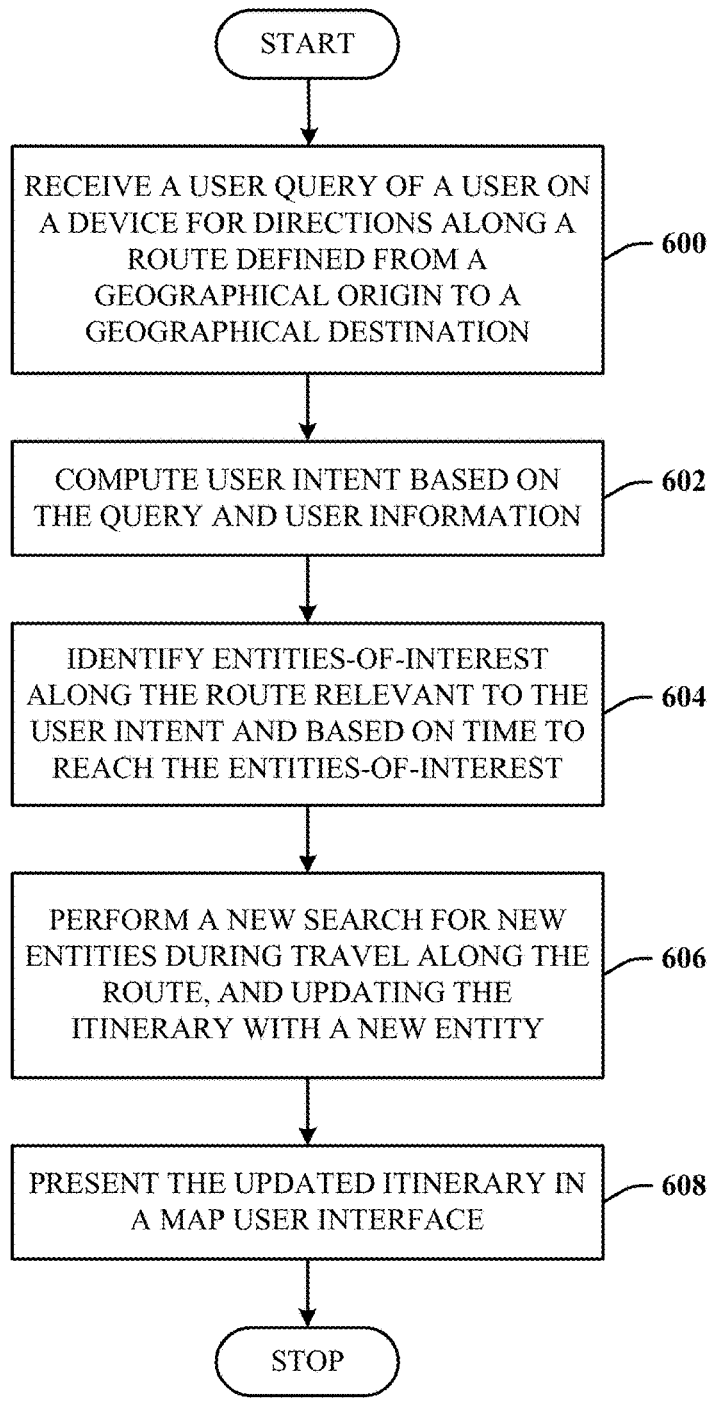
FIG. 6 illustrates an alternative method in accordance with the disclosed architecture.

FIG. 6 illustrates an alternative method in accordance with the disclosed architecture. At 600, a user query of a user is received on a device, the query for directions (and/or map) along a route defined from a geographical origin to a geographical destination. At 602, user intent is computed based on the query and user information. At 604, entities-of-interest along the route relevant to the user intent and based on time to reach the entities-of-interest, are identified. At 608, a new search for new entities can be performed during travel along the route, and the itinerary updated with a new entity. At 608, the updated itinerary is presented in a map user interface.

The method can further comprise assigning to the route a greater number of the entities-of-interest at more popular locations as compared to less popular locations. The capability to adjust entities shown provides an advertising inroad by vendors to populate entities with targeted advertising and notifications, for example.

The method can further comprise, while traveling the route, prompting the user about visiting an entity-of-interest along the route or departing from the route at a specific point along the route. User reaction to the notification can also be employed to dynamically adjust user intent and ultimately, the itinerary and entity types provided along the route. In other words, while the user had a first goal in mind for making the trip, that goal may change multiple times once the trip begins, thereby altering the itinerary as well. It can be the case that once an update action is initiated, a save and store operation is performed so the user can always migrate back to an earlier version of the itinerary.

The method can further comprise updating the itinerary with the new entity based on travel time to the new entity from the route. The method can further comprise presenting cards in the map user interface that show a list of entities and categories of entities.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
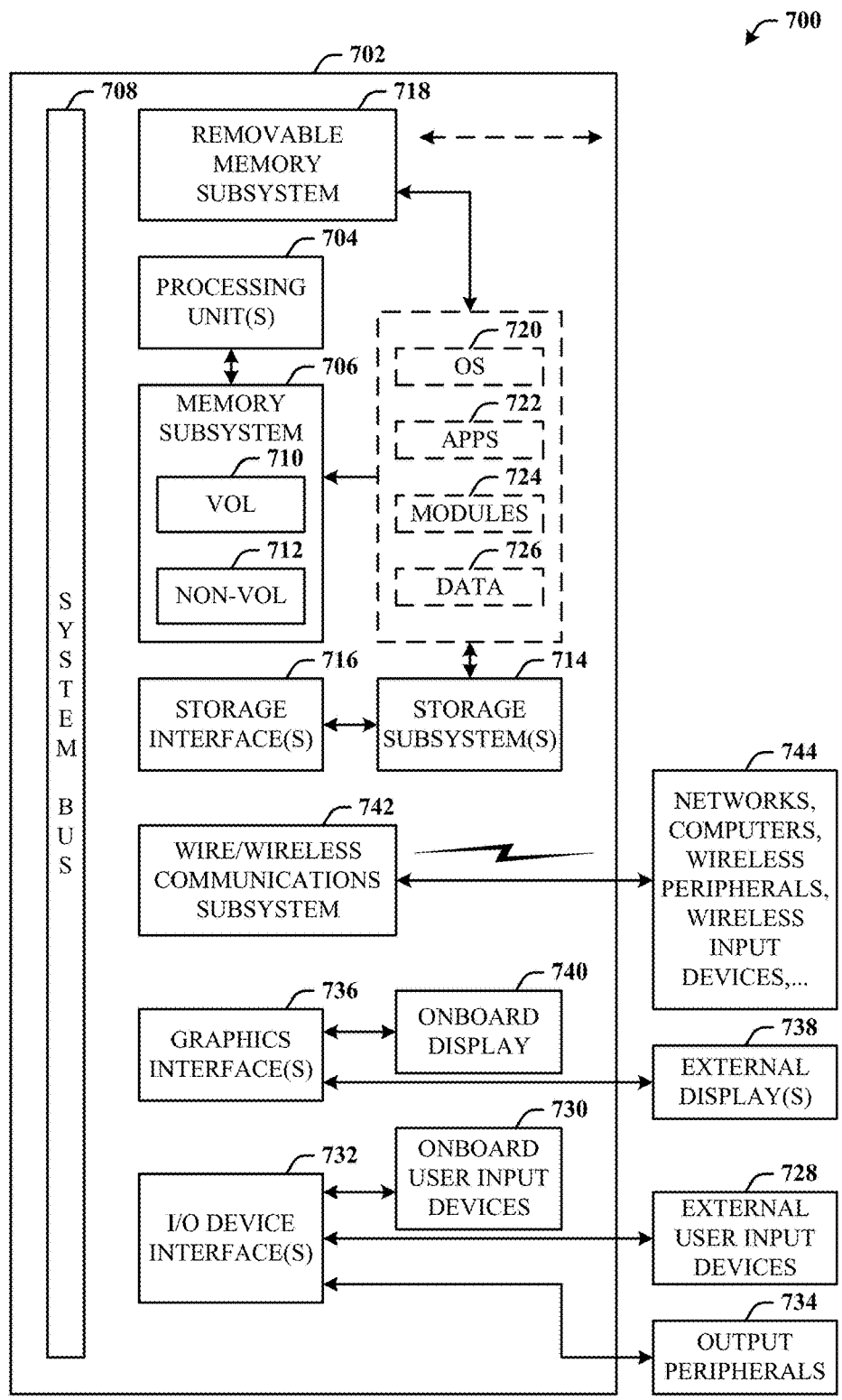
FIG. 7 illustrates a block diagram of a computing system that executes search along the route in accordance with the disclosed architecture.

Referring now to FIG. 7, there is illustrated a block diagram of a computing system 700 that executes search along the route in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium (where the medium is any physical device or material on which data can be electronically and/or optically stored and retrieved) such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the system 200 of FIG. 2, items and components of the system 300 of FIG. 3, items and elements of the UX map interface 400 of FIG. 4 (similar to map user interface 106), and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclose architecture can be implemented as a system, comprising: means for receiving a user query for directions along a route defined from a geographical origin to a geographical destination; means for computing user intent based on the query and user information; means for identifying entities-of-interest along the route relevant to the user intent and based on time to reach the entities-of-interest (from the route); means for assigning to the route a greater number of the entities-of-interest at more popular locations as compared to less popular locations; and means for presenting the route and entities-of-interest (e.g., on a map and in combination with the map).

The disclose architecture can be implemented as an alternative system, comprising: means for receiving a user query of a user on a device for directions along a route defined from a geographical origin to a geographical destination; means for computing user intent based on the query and user information; means for identifying entities-of-interest along the route relevant to the user intent and based on time to reach the entities-of-interest; means for performing a new search for new entities during travel along the route, means for updating the itinerary with a new entity; and, means for presenting the updated itinerary in a map user interface.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising computer-executable instructions that when executed by one or more processing units, perform acts of:
   receiving a user query for directions along a route defined from a geographical origin to a geographical destination;
   computing, using one or more machine learning algorithms, a user intent based on the user query and user information;
   identifying one or more entities-of-interest along the route relevant to the user intent and based on time to the entities-of-interest from the route;
   assigning to the route a greater number of the one or more entities-of-interest at more popular locations as compared to less popular locations; and
   causing the route and the one or more entities-of-interest to be presented as an itinerary on an output device.

2. The method of claim 1, further comprising sharing the itinerary with at least one other user or one or more other devices of the user.

3. The method of claim 1, further comprising enabling tagging and storage of content obtained along the route.

4. The method of claim 1, further comprising editing the itinerary to expand as travel occurs along the route.

5. The method of claim 1, further comprising performing interactive voice communications with a computing device connected to the output device to interact with the itinerary.

6. The method of claim 1, further comprising:
   identifying one or more new entities-of-interest during travel along the route based on travel time to the one or more new entities-of-interest from the route; and
   updating the itinerary to a new itinerary that includes the one or more new entities-of-interest.

7. The method of claim 1, further comprising:
   ranking the one or more entities-of-interest; and
   filtering the one or more entities-of-interest.

8. A method comprising computer-executable instructions that when executed by one or more processing units, perform acts of:
   receiving a user query for directions along a route defined from a geographical origin to a geographical destination;
   computing, using one or more machine learning algorithms, a user intent based on the user query and user information;
   identifying one or more entities-of-interest along the route relevant to the user intent and based at least on time to the entities-of-interest from the route;
   assigning to the route a greater number of the one or more entities-of-interest at more popular locations as compared to less popular locations;
   causing the one or more entities-of-interest and the route to be presented as an itinerary in a user interface on a display;
   identifying one or more new entities during travel along the route;
   updating the itinerary with the one or more new entities-of-interest; and
   causing the updated itinerary to be presented in the user interface on the display.

9. The method of claim 8, further comprising:
   while traveling the route, prompting a user about visiting an entity-of-interest along the route or departing from the route at a specific point along the route;
   modifying the user intent based on a response received in response to the prompting; and
   updating the one or more entities-of-interest presented in the map user interface based on the modified user intent.

10. The method of claim 8, further comprising updating the itinerary with the one or more new entity-of-interests based on travel time to the new entity-of-interest from the route.

11. The method of claim 8, further comprising presenting one or more entity cards in the map user interface that show at least one of a list of entities or categories of entities.

12. A system, comprising:
   one or more processing units; and
   one or more memories storing instructions that, when executed by the one or more processing units, cause the system to perform a method comprising:
     receiving a user query for directions along a route defined from a geographical origin to a geographical destination;
     computing, using a machine learning apparatus, a user intent based at least on the user query;
     identifying one or more entities-of-interest along the route relevant to the user intent and based on time to the one or more entities-of-interest from the route;

assigning to the route a greater number of the one or more entities-of-interest at more popular locations as compared to less popular locations;

causing the route and the one or more entities-of-interest to be presented on a display;

identifying one or more new entities-of-interest during travel along the route relevant to the user intent; and updating a presentation of the one or more entities-of-interest on the display with the one or more new entities-of-interest.

13. The system of claim 12, wherein computing the user intent based at least on the user query comprises computing the user intent based on the user query and user information.

14. The system of claim 12, wherein identifying one or more new entities-of-interest during travel along the route relevant to the user intent comprises identifying one or more new entities-of-interest during travel along the route relevant to the user intent and based on time to the one or more new entities-of-interest from the route.

15. The system of claim 12, wherein the method further comprises performing interactive voice communications with a computing device connected to the display to interact with the presentation on the display.

16. The system of claim 12, wherein the method further comprises:

while traveling the route, prompting a user about visiting an entity-of-interest along the route;

modifying the user intent based on a response received in response to the prompting; and updating the one or more entities-of-interest presented on the display based on the modified user intent.

17. The system of claim 12, wherein the method further comprises:

while traveling the route, prompting a user about departing from the route at a specific point along the route;

modifying the user intent based on a response received in response to the prompting; and updating the one or more entities-of-interest presented on the display based on the modified user intent.

18. The system of claim 12, wherein the method further comprises performing interactive voice communications with a computing device connected to the display to modify the presentation on the display.

19. The system of claim 12, wherein the method further comprises:

receiving content obtained while traveling along the route; and storing the received content, wherein the received content comprises at least one of:

one or more pictures associated with at least one entity-of-interest;

one or more video files associated with at least one entity-of-interest;

one or more audio files associated with at least one entity-of-interest; or one or more tags associated with at least one entity-of-interest.

20. The method of claim 1, wherein the user information comprises a user search history.

* * * * *